July 3, 1923.
G. ADSIT
BEAM SUPPORT
Filed Feb. 27, 1922
1,460,468
2 Sheets-Sheet 1
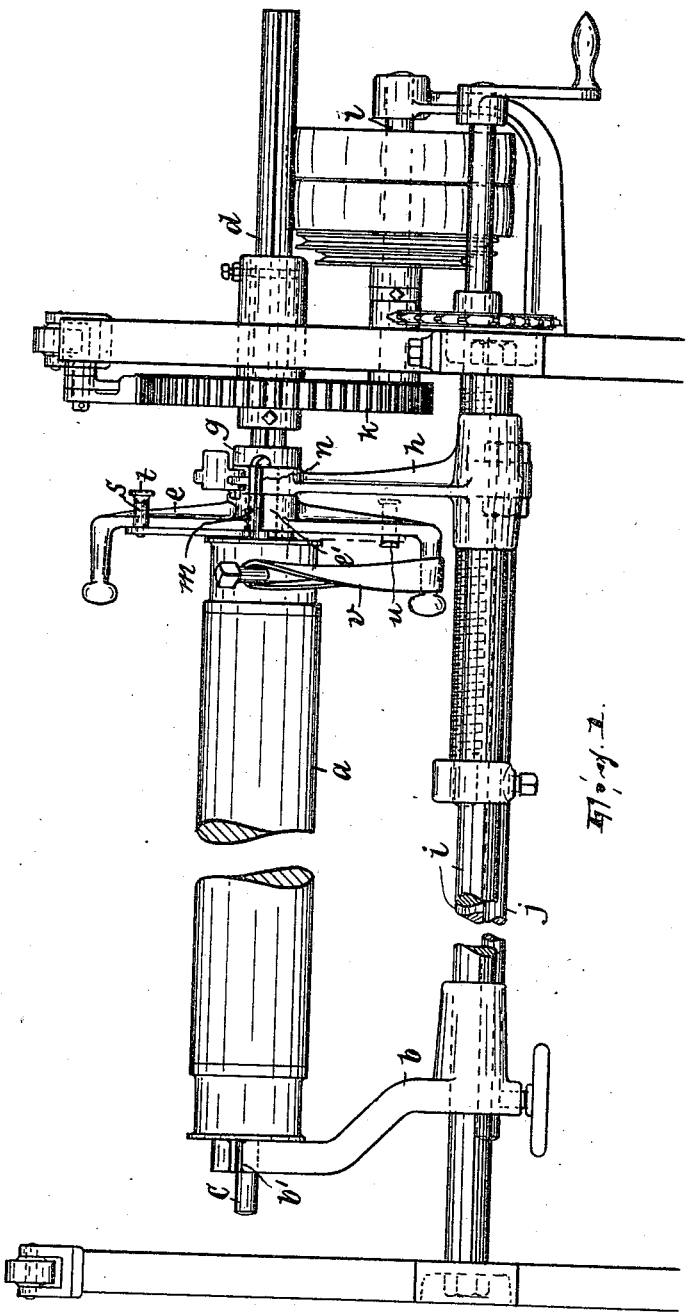
WITNESS
INVENTOR
George Adsit,
BY
ATTORNEY.

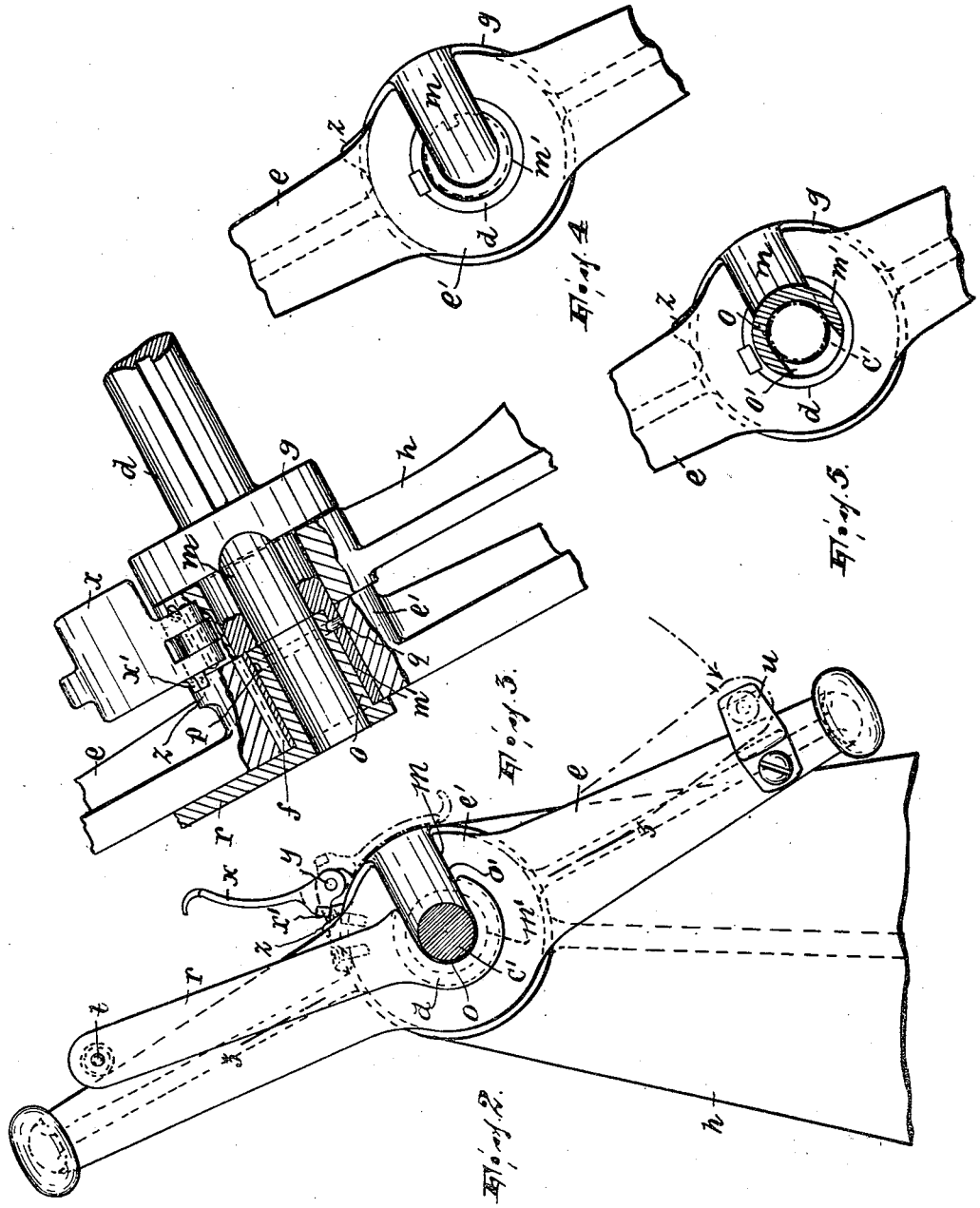

Patented July 3, 1923.

1,460,468

UNITED STATES PATENT OFFICE.

GEORGE ADSIT, OF PATERSON, NEW JERSEY, ASSIGNOR TO BENJAMIN EASTWOOD COMPANY, OF PATERSON, NEW JERSEY, A CORPORATION OF NEW JERSEY.

BEAM SUPPORT.

Application filed February 27, 1922. Serial No. 539,431.

*To all whom it may concern:*

Be it known that I, GEORGE ADSIT, a citizen of the United States, residing at Paterson, in the county of Passaic and State of New Jersey, have invented certain new and useful Improvements in Beam Supports, of which the following is a specification.

This invention relates to beam supporting means, as the means for supporting the beam in warping machines, and particularly to beam supporting of the class where there are two supports, one for each end of the beam, and one of these supports is revoluble in a bearing and serves to rotate the beam. Usually in these particular structures the revoluble beam support has an endwise bore forming a seat for one trunnion of the beam, the other beam support having a socket in which the other beam trunnion may be dropped; and to introduce or remove a beam, especially if it is heavy, requires three men, two to support the beam at its ends and withdraw it from or introduce it into the bore and a third to shift the opposite support away from or toward the revoluble support, as the case may be. The object of this invention is to construct the revoluble support and its bearing so that the corresponding trunnion may be introduced into or removed from the revoluble support by a movement transverse instead of longitudinally of the beam axis and so that the bearing may, as usual, perform its part in sustaining directly the load represented by the beam. To these ends, the revoluble support is provided with a laterally open recess to receive the trunnion and extending within the bearing and the bearing with a slot with which the recess may come into register to permit introduction or removal of the beam, and in the support is an annular retaining member revoluble around the axis of the support and having a lateral recess forming a seat for the beam and adapted on revolving said member to stand in or out of registry with the recess of said support. Another object is to provide means for preventing possibility of injury to an attendant due to his fingers projecting into the recess of the support when the latter is rotating.

In the drawings,

Fig. 1 is a front elevation of the beam end of a warping machine embodying my improvements;

Fig. 2 is a sectional view on a larger scale taken between the revoluble beam support and the adjoining end of the beam and looking toward the former;

Fig. 3 is a view showing partly in front elevation and partly in section, on the same scale, the parts appearing in Fig. 2;

Fig. 4 is a side elevation of the revoluble support with the retaining member removed; and Fig. 5 is a similar view, showing the retaining member in place and in section.

$a$ is the beam and $b$ is its non-revoluble support, having a crotch $b'$ to receive one trunnion of the beam, as $c$. The revoluble support for receiving the other trunnion of the beam consists of a shaft $d$ which has a two-armed yoke $e$ thereon, the hub $e'$ of the yoke being keyed on the end of the shaft at $f$. The shaft has a fixed collar $g$ thereon spaced from the hub between which and the collar the shaft is journaled in a bearing member $h$. It is not material how the members $b$ and $h$ are supported, but, following a well known construction, they are in the present instance both shown slidable on a pair of horizontal rails $i$ which form a part of the machine frame and they are rigidly connected by a rod $j$ so as to form a unitary structure. Also, following said well known construction, the shaft $d$ penetrates and is splined in a suitable revoluble member $k$ for rotating the same which is journaled in the frame and may be suitably driven from the drive shaft $l$.

The revoluble support $d$—$e$ is formed with a laterally open recess $m$ which reaches from the outer end of the hub $e'$ into the part of said support immediately contained within the bearing member $h$, and this recess is adapted to receive the right-hand trunnion $c'$ by simply dropping the latter into the recess when the support is turned so that the recess is upward. To permit the trunnion to enter or leave the recess the bearing member $h$ has a slot $n$ of approximately the same width as the recess $m$. By forming the recess in the journal-portion of the revoluble support as well as in its hub portion $e'$ the trunnion of the beam may be made long enough so as to overlie the bearing member $h$ which thereby directly supports the load represented by the beam and the material wound thereon.

The part of the recess $m$ which is contained within the yoke $e'$ is enlarged, as at $m'$, to form a cylindrical bearing, and in this is revoluble a sleeve or annular retaining member $o$ which is slotted or cut away from end to end, as at $o'$, its bore and slot forming a laterally open recess affording a seat for the trunnion which is flush with the part of the recess $m$ that is in the journal-portion of the supporting member $d$—$e$. The sleeve is retained in the bearing $m'$ by having a circumferential groove $p$ in which is engaged the end of a pin $q$ that is fitted into the shaft $d$ before the yoke $e$ is keyed thereon. The sleeve is adapted to turn in its bearing back and forth, between definite limits, at one of said limits having its slot $o'$ registering with the recess in the revoluble support, so that the trunnion may be introduced into or removed from said recess, and at the other of the limits extending across the recess so that when the trunnion is in the recess it will be retained therein by the sleeve (Figs. 2 and 5). The limited rotary movement of the sleeve may be accomplished by an arm $r$ which projects radially therefrom in contact with the face of the yoke $e$ adjoining the beam, said arm having a post $s$ thereon adapted to abut each arm of the yoke, $t$ being a spring pin in the post which is adapted to override a lug $u$ on one of the yoke arms and by bearing endwise frictionally against the same hold the sleeve in the closed position.

The beam may be connected to rotate with the revoluble support in any way, as by a strap $v$ which connects one of its yoke arms and a stud $w$ projecting from the beam.

When the beam is to be entered to or removed from the supports $b$ and $d$—$e$ the latter is turned to such a position that its recess $m$ coincides with the slot $n$ of the bearing member $h$; the sleeve is then turned so that its slot (see Fig. 2) registers with the registering recess of the support and slot of the bearing. The beam can then be moved to or from its seat without endwise movement thereof and the incidental shifting of the support $b$ toward and from the support $d$—$e$.

In order to prevent injury to the attendant in case his fingers should be placed in the recess $m$ when it registers with the slot in the bearing member $h$ and the machine is being driven I provide a guard or cover for the slot as follows: In order to resist the tendency of the warp draft on the beam to unship it the slot $n$ is arranged at about 45° forward from the top of the bearing member $h$, and this guard or cover $x$ is pivoted to said member on an axis $y$ parallel with that of the revoluble support and relatively above the slot, in its "open" or uncovering position standing upright and having a bearing backward against said member. It has a lateral lug $x'$ arranged eccentrically of its pivot $y$. On the hub $e'$ is arranged a cam lug $z$ into whose path of movement the lug $x'$ projects when the cover is open (Fig. 2). As soon as the machine starts up this cam $z$ engages the lug $x'$, causing the cover $x$ to fall to covering position.

Having thus fully described my invention, what I claim as new and desire to secure by Letters Patent is:—

1. Beam supporting means including a bearing, a revoluble support therein having a laterally open recess extending to its end and within the bearing and adapted to receive the beam trunnion, the bearing having a slot with which the recess is adapted to register on revolving the support, and a retaining member revoluble in and around the axis of the support and having a lateral recess forming a seat for the beam and adapted on revolving said member to stand in or out of registry with the recess of the support.

2. Beam supporting means including a bearing, a revoluble support therein having a laterally open recess extending to its end and within the bearing and adapted to receive the beam trunnion, the bearing having a slot with which the recess is adapted to register, and a cover on the bearing movable into covering relation to the slot and also to a position of rest in uncovering relation to the slot, said support having means on rotation thereof to engage said cover when in the uncovering position and move the same to the covering position.

In testimony whereof I affix my signature.

GEORGE ADSIT.